United States Patent
Rusu et al.

(10) Patent No.: US 7,464,276 B2
(45) Date of Patent: *Dec. 9, 2008

(54) METHOD AND APPARATUS FOR ADJUSTING THE VOLTAGE AND FREQUENCY TO MINIMIZE POWER DISSIPATION IN A MULTIPROCESSOR SYSTEM IN RESPONSE TO COMPUTE LOAD

(75) Inventors: Stefan Rusu, Sunnyvale, CA (US); David J. Ayers, Fremont, CA (US); James S. Burns, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/524,220

(22) Filed: Sep. 19, 2006

(65) Prior Publication Data

US 2007/0016814 A1    Jan. 18, 2007

Related U.S. Application Data

(63) Continuation of application No. 09/968,565, filed on Sep. 28, 2001, now Pat. No. 7,111,178.

(51) Int. Cl.
   *G06F 1/26* (2006.01)
(52) U.S. Cl. .................. 713/300; 713/320; 713/322
(58) Field of Classification Search ................. 713/300, 713/320, 322, 323, 324, 330, 340
See application file for complete search history.

(56) References Cited

U.S. PATENT DOCUMENTS

| | | | |
|---|---|---|---|
| 5,502,838 A * | 3/1996 | Kikinis | ........................ 713/501 |
| 5,727,193 A | 3/1998 | Takeuchi | |
| 5,745,375 A | 4/1998 | Reinhardt et al. | |
| 5,778,237 A | 7/1998 | Yamamoto et al. | |
| 5,787,294 A * | 7/1998 | Evoy | .......................... 713/320 |
| 5,815,693 A * | 9/1998 | McDermott et al. | ......... 713/501 |
| 5,832,284 A | 11/1998 | Michail et al. | |
| 6,076,171 A * | 6/2000 | Kawata | ...................... 713/501 |

(Continued)

FOREIGN PATENT DOCUMENTS

EP    0 632 360 A1    1/1995

(Continued)

OTHER PUBLICATIONS

U.S. Patent and Trademark Office (IPEA). Written Opinion re: International Application No. PCT/US02/31160, 4 pages, Sep. 15, 2004.

(Continued)

*Primary Examiner*—Nitin C Patel
(74) *Attorney, Agent, or Firm*—Erik R. Nordstrom

(57) ABSTRACT

A method for adjusting the voltage and frequency to minimize power dissipation in a processor. The method of one embodiment comprises determining a power consumption value. The power consumption value is evaluated to obtain a new operating point. The new operating point is compared with a present operating point. A frequency setting and a voltage setting are adjusted to correspond to the new operating point if the new operating point is different from the present operating point.

19 Claims, 3 Drawing Sheets

U.S. PATENT DOCUMENTS

| | | | |
|---|---|---|---|
| 6,192,479 B1 * | 2/2001 | Ko | 713/300 |
| 6,311,287 B1 * | 10/2001 | Dischler et al. | 713/601 |
| 6,415,388 B1 | 7/2002 | Browning et al. | |
| 6,574,740 B1 | 6/2003 | Odaohhara et al. | |
| 6,584,571 B1 * | 6/2003 | Fung | 713/310 |
| 6,966,008 B2 * | 11/2005 | Athas | 713/320 |
| 7,254,721 B1 * | 8/2007 | Tobias et al. | 713/300 |
| 2005/0204179 A1 * | 9/2005 | Watts et al. | 713/322 |

FOREIGN PATENT DOCUMENTS

| | | |
|---|---|---|
| WO | WO 00/26747 A1 | 5/2000 |
| WO | WO 00/39661 A1 | 7/2000 |

OTHER PUBLICATIONS

U.S. Patent and Trademark Office (IPEA), International Preliminary Examination Report re: International Application No. PCT/US02/31160, 4 pages1 Oct. 14, 2004.

* cited by examiner

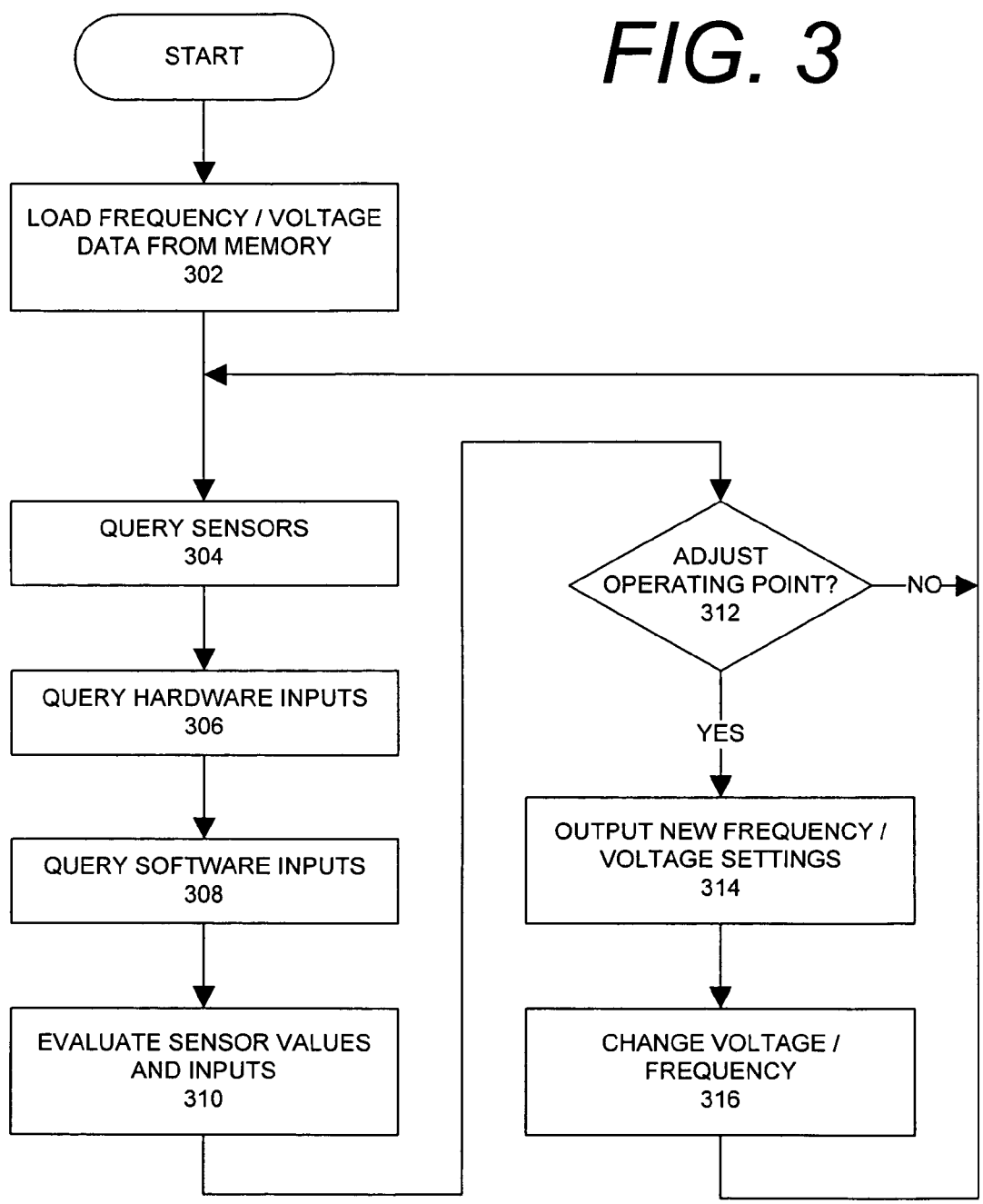

METHOD AND APPARATUS FOR ADJUSTING THE VOLTAGE AND FREQUENCY TO MINIMIZE POWER DISSIPATION IN A MULTIPROCESSOR SYSTEM IN RESPONSE TO COMPUTE LOAD

RELATED APPLICATIONS

This application is a continuation application of U.S. application Ser. No. 09/968,565, filed Sep. 28, 2001, now U.S Pat. No. 7,111,178.

FIELD OF THE INVENTION

The present invention relates generally to the field of microprocessors and computer systems. More particularly, the present invention relates to a method and apparatus for adjusting the voltage and frequency to minimize power dissipation in a multiprocessor system.

BACKGROUND OF THE INVENTION

In recent years, the price of personal computers (PCs) have rapidly declined. As a result, more and more consumers have been able to take advantage of newer and faster machines. Computer systems have become increasingly pervasive in our society. But as the speed of the new processors increases, so does the power consumption. Furthermore, high power consumption can also lead to thermal issues, as the heat has to be dissipated from the computer system. And unlike desktop computers that are powered by an alternating current (AC) source, notebook computers usually run off a limited battery supply. If a mobile computer is operating at the same performance level as a desktop machine, the power is drained relatively quickly.

In order to extend battery life of mobile computers without widening the performance gap with desktop counterparts and to reduce the power consumption of desktop machines, computer manufacturers and designers have instituted power saving technology. One attempt to reduce power consumption entails the use of low power circuit devices. Another power saving method is to use software in controlling system power and shutting down system devices that are not needed. Several voltage/frequency adjustment schemes including Intel® SpeedStep™ technology have been developed to maximize battery life for mobile processors.

But even as designers slowly reduce the power needs of the overall system, the power requirements of the processor have often remained steady. Furthermore, existing schemes are usually targeted at mobile products. Present methods that implement deep processor operating frequency reductions do so by adjusting the bus ratios. Such methods are not feasible in a server product because of the significant performance impact. New schemes have to be developed to target power reduction at the processor at the desktop and server segments.

BRIEF DESCRIPTION OF THE DRAWINGS

The present invention is illustrated by way of example and not limitations in the figures of the accompanying drawings, in which like references indicate similar elements, and in which:

FIG. 3 is a flow chart representing one embodiment of a method in accordance with the present invention for adjusting the voltage and frequency to minimize power dissipation in a multiprocessor system.

DETAILED DESCRIPTION

Figure 1:
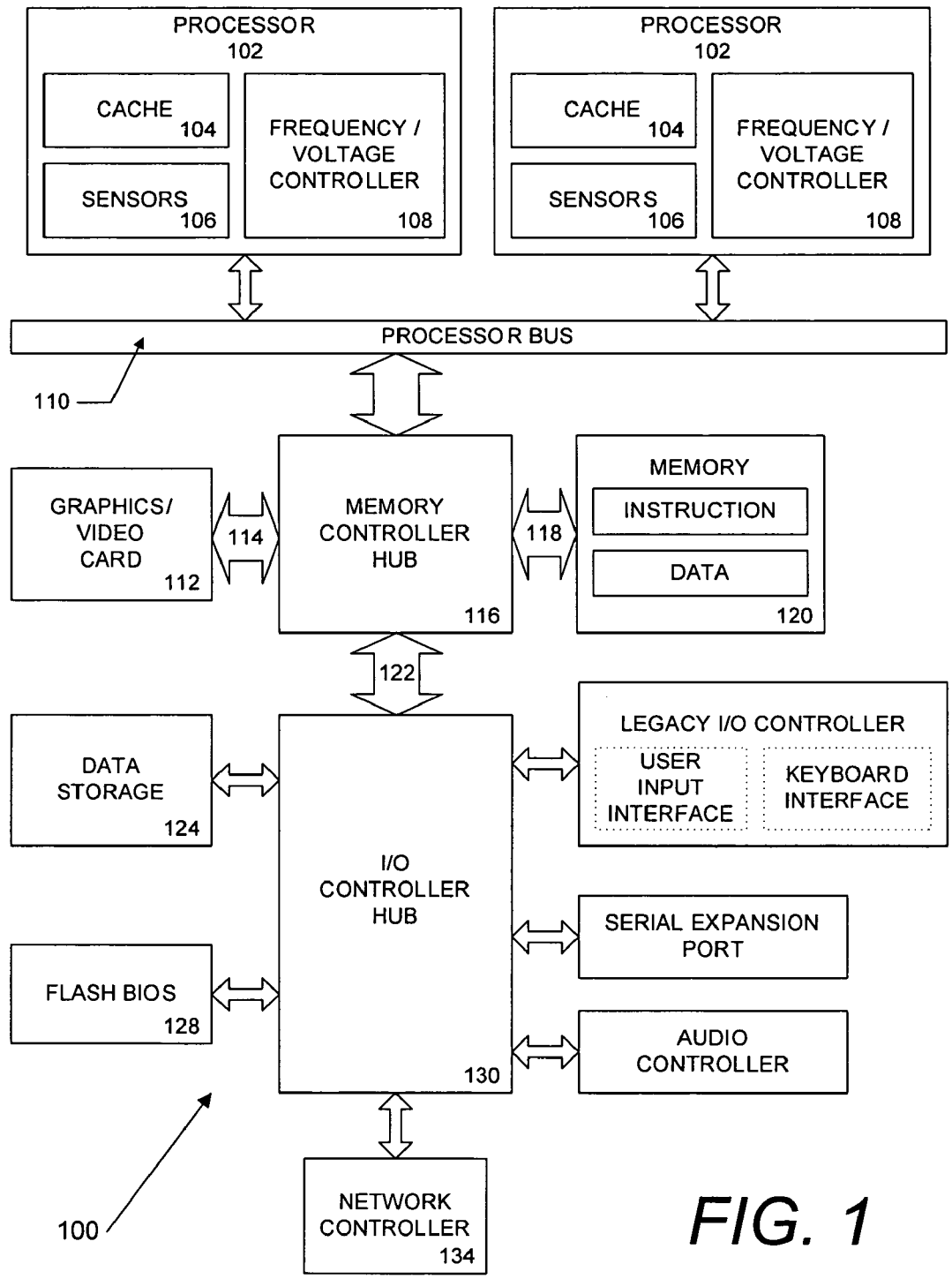
FIG. 1 is block diagram of a multiprocessor computer system formed with processors that include a mechanism for adjusting the voltage and frequency to minimize power dissipation in accordance with the present invention.

A method and apparatus for adjusting the voltage and frequency to minimize power dissipation in a multiprocessor system is disclosed. The embodiments described herein are described in the context of a microprocessor, but are not so limited. Although the following embodiments are described with reference to a processor, other embodiments are applicable to other integrated circuits or logic devices. The same techniques and teachings of the present invention can easily be applied to other types of circuits or semiconductor devices that can benefit from power savings.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

Many present day microprocessors consume significant amounts of power during normal operations. This power consumption has also led to issues in power dissipation. Processors and systems are generally designed to operate within set thermal envelopes. As the performance and power requirements increase, this envelope can often be pushed to the limit or even exceeded. A number of different schemes have been developed to address this issue in the mobile arena. However, these same schemes cannot be applied to desktop and server environments due to system and performance requirements.

For instance, several voltage/frequency adjustments schemes developed to maximize batter life for mobile processors implement deep reductions in the processor operating frequency by adjusting the bus ratio. Such deep frequency reductions are not feasible in server products because large frequency reductions would have significant performance impacts. A smaller frequency reduction range makes adjusting the bus ratio impractical because the smaller range would not provide enough granularity. Furthermore, mobile processor voltage/frequency adjustment schemes are generally triggered by changing system power supply from a better to main power and vice versa. Most of these adjustment schemes also operate under software control, while others also require user control.

On the other hand, a server environment cannot facilitate the need for user input. A server also operates off a constant main power supply. In a multiprocessor implementation, it is difficult for software to completely control the voltage and frequency of each processor in the system. A new technique wherein each individual processor can have local, independent control over its own voltage and frequency operating point is needed to address these needs. The voltage/frequency operating point in embodiments of the present invention is determined by an on-chip controller and not by a software applet as in some existing methods. One embodiment of a controller chooses the operating point in order to maximize the performance while not exceeding the thermal power limit. Thus the system is able to react faster to a power surge in a server processor.

Embodiments of the present invention offer power management capabilities to multiprocessor servers. Application of an embodiment of the present invention can minimize the total power consumption for an N-way multiprocessor server, while providing performance on demand. This feature can be essential for increasing the processor density for rack-mounted servers. Each processor manages its own power dissipation, while the system software has a high-level control over how the power is burned in an N-way multiprocessor system.

Other embodiments can also be used in single processor desktop systems. A frequency/voltage adjusting mechanism of the present invention can allow a single processor design to operate at a variety of frequencies. These various frequencies can correspond to different performance levels that consumers want. One processor die can be set to operate at 1.6 gigahertz (GHz), while another die from the same wafer can be set to operate at 1.5 GHz, and another at 1.4 GHz. For example, one processor design can be fabricated during the manufacturing process. The processor is then set to operate at a one specific frequency before being delivered to a customer after manufacturing. The valid operating points are programmed into the fuse array or memory. Thus a processor is capable of providing the performance necessary for that particular computer system.

Referring now to FIG. 1, an exemplary computer system 100 is shown. System 100 includes a component, such as a processor, employing adjustments of its voltage and frequency to minimize power dissipation in accordance with the present invention, such as in the embodiment described herein. System 100 is representative of processing systems based on the PENTIUM® III, PENTIUM® 4, Itanium™ microprocessors available from Intel Corporation of Santa Clara, Calif., although other systems (including PCs having other microprocessors, engineering workstations, set-top boxes and the like) may also be used. In one embodiment, sample system 100 may be executing a version of the WINDOWS™ operating system available from Microsoft Corporation of Redmond, Wash., although other operating systems and graphical user interfaces, for example, may also be used. Thus, the present invention is not limited to any specific combination of hardware circuitry and software.

The present enhancement is not limited to computer systems. Alternative embodiments of the present invention can be used in other devices such as, for example, handheld devices and embedded applications. Some examples of handheld devices include cellular phones, Internet Protocol devices, digital cameras, personal digital assistants (PDAs), and handheld PCs. Embedded applications can include a microcontroller, a digital signal processor (DSP), system on a chip, network computers (NetPC), set-top boxes, network hubs, wide area network (WAN) switches, or any other system which use a mechanism for minimizing power dissipation for other embodiments.

FIG. 1 is a block diagram of one embodiment of a multiprocessor computer system 100 formed with processors 102 that include a mechanism for adjusting the voltage and frequency to minimize power dissipation in accordance with the present invention. The present embodiment is described in the context of a multiprocessor system, but alternative embodiments can included in single processor desktop or server system. System 100 is an example of a hub architecture. The computer system 100 includes processors 102 that processes data signals. Processors 102 can be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 1 shows an example of an embodiment of the present invention implemented in a multiprocessor system 100. However, it is understood that other embodiments may alternatively be implemented as systems having a single processor. Processors 102 are coupled to a processor bus 110 that transmits data signals between processors 102 and other components in the system 100. The elements of system 100 perform their conventional functions well known in the art.

In one embodiment, processors 102 include an internal cache memory 104. Depending on the architecture, processors 102 can have a single internal cache or multiple levels of internal caches such as a Level 1 (L1) and a Level 2 (L2) cache. Sensors 106 and a frequency/voltage controller unit 108 also resides in processors 102. The sensor monitors the total power consumption of the chip and can trigger a voltage/frequency adjustment if needed. Sensors 106 may reside on the die or on the processor module. Alternate embodiments of a frequency/voltage controller mechanism 108 can also be used in microcontrollers, embedded processors, graphics devices, DSPs, and other types of logic circuits.

For the embodiment of a multiprocessor system 100 in FIG. 1, each processor 102 has the capability to control its own voltage and frequency operating points through an on-die power sensors 106 and a hardware controller 108. The power sensor 106 of this embodiment monitors the power consumption of the processor 102 and sends a digitally encoded value to the controller 108. The sensor 106 can measure the current consumption of the processor or the temperature of the chip. The controller 108 can calculate the power consumption based on the present operating voltage and current. Another embodiment of a power sensor 106 can monitor the processor compute load or activity by monitoring the instructions entering the processor execution pipeline. The controller 108 can also receive input from sensors external to processor 102.

System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processors 102. A cache memory 104 can reside inside the processors 102 that stores data signals stored in memory 120. Alternatively, in another embodiment, the cache memory can reside external to the processors 102.

A system logic chip 116 is coupled to the processor bus 110 and memory 120. The system logic chip 116 in the illustrated embodiment is a memory controller hub (MCH). The processors 102 communicate to the MCH 116 via a processor bus 110. The MCH 116 provides a high bandwidth memory path 118 to memory 120 for instruction and data storage and for storage of graphics commands, data and textures. The MCH 116 directs data signals between the processors 102, memory 120, and other components in the system 100 and bridges the data signals between processor bus 110, memory 120, and system I/O 122. In some embodiments, the system logic chip 116 provides a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices. Some examples are the audio controller, firmware hub (flash BIOS) 128, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device. System 100 also includes a power supply that can both source and sink current to the above mentioned components.

For another embodiment of a system, one implementation of a frequency/voltage adjusting power dissipation mechanism can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip. By including one embodiment of the present invention on the system on a chip, the frequency/voltage controller can adjust the processor frequency and voltage to minimize power dissipation.

Figure 2:
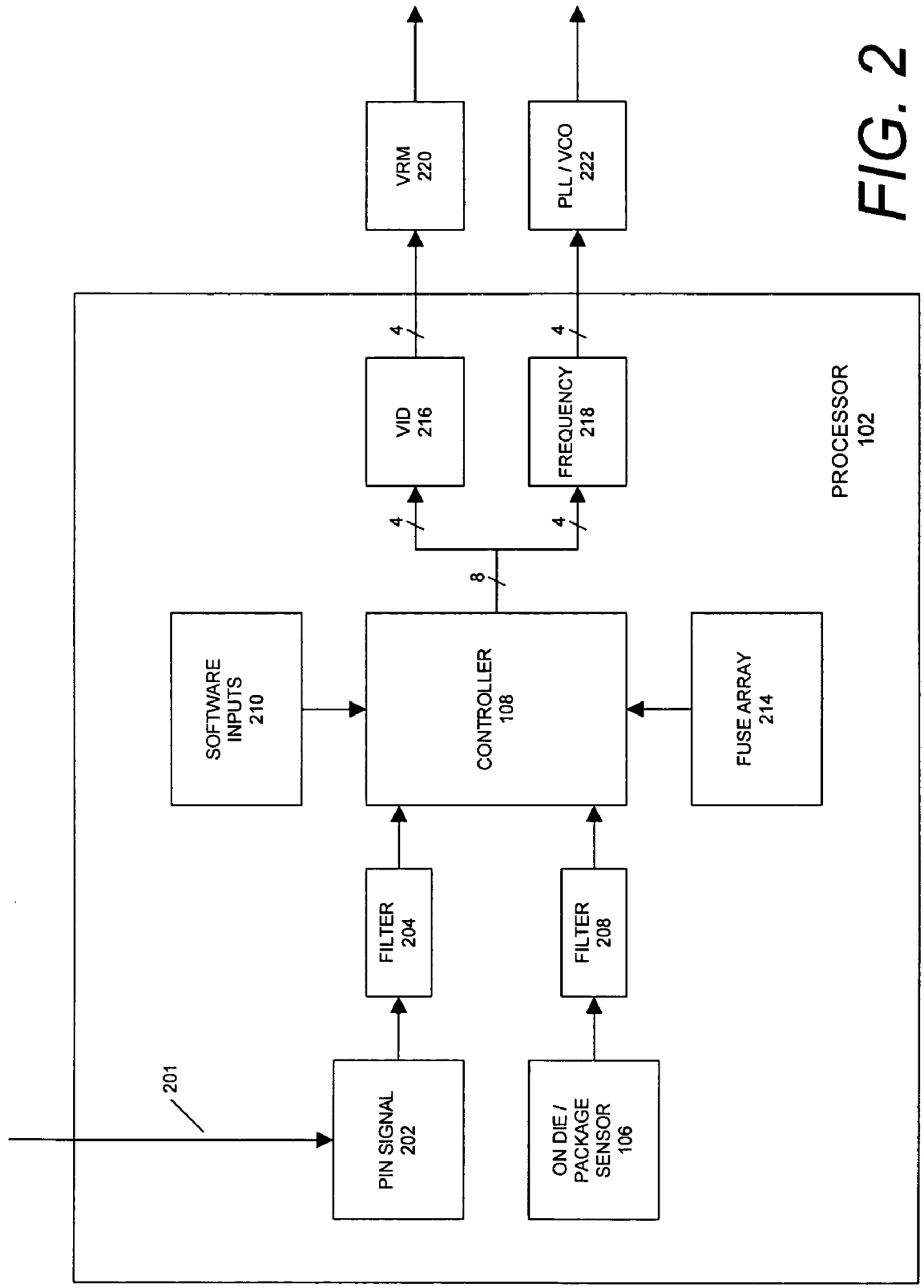
FIG. 2 is a block diagram of a processor that includes a mechanism for adjusting the voltage and frequency in accordance with the present invention.

FIG. 2 is a block diagram of a processor 102 that includes a mechanism for adjusting the voltage and frequency in accordance with the present invention. The processor voltage and frequency have to be adjusted together in order to maintain proper operation. The voltage cannot be lowered without lowering the clock frequency. Speed path errors can result if the voltage level is reduced without a change in frequency. The clock frequency can be adjusted fairly instantaneously. The voltage, on the other hand, has a slower response time to an adjustment. The mechanism needs to monitor the frequency and voltage levels during an adjustment to ensure that performance is not impacted.

In this embodiment, processor 102 comprises an on die/package sensor 106 and controller 108. Sensor 106 of this embodiment monitors the amount of current being consumed in the processor 102. Controller 108 can compute the power being dissipated by the processor 102 based on this current consumption. The processor can also have more than one on-die or on package sensor. For alternate embodiments, sensor 106 can monitor temperature and/or processing load. Furthermore, sensor 106 can be located off the processor module itself. Output from sensor 106 is propagated through a filter 208 to controller 108. Filter 208 is a low pass filter that ensures that the controller 108 does not react at any small glitch that may come from the sensor 106. The filter 208 ensures that the sensor 106 reliably indicates a change in condition at the sensor 106 before activating the controller 108 to take action. Filter 208 of this embodiment has programmable thresholds and can be adjusted for different settings.

Controller 108 of this embodiment can receive input from a number of sources. An external hardware pin 201 provides a pin signal 202. This external pin allows a user or system to bypass software control and to send a control signal directly to the frequency/voltage adjustment controller 108. The pin signal 202 may be a hardware or software interrupt. The pin signal 202 is coupled through a filter 204 to controller 108. Filter 204 is a low pass filter that ensures that the controller 108 does not react at any small glitch that may come from the pin signal 202. The filter 204 ensures that the sensor 106 reliably indicates a change in condition on the pin signal 202 before activating the controller 108 to take action. Filter 204 of this embodiment has programmable thresholds and can be adjusted for different settings. The controller 108 also receives software inputs 210. System management software can provide software inputs 210 to alter the operation of the controller 108. The system can tell each individual processor 102 whether it needs to slow down and reduce its power dissipation.

The controller 108 of this embodiment operates independently of user control, but can also receive commands from the system software through a control register. The software can disable the automatic voltage/frequency adjustment through a bit in the control register. Similarly, the software can override the sensor inputs. The software can also push the processor 102 to a lower power state by lowering the voltage/frequency operating point. In order to maintain high performance, it is desirable to keep the processor frequency as high as possible. This adjustment is performed through the manipulation of bits in this control register. Some prior art schemes cause the clock to stop when a trigger temperature is detected and exceeded. Even thought the system continues to operate, the processor shuts down into a sleep state. Methods of the present invention keeps the clock running at a lower frequency.

For this embodiment of the present invention, the software control is not allowed to raise the operating point of the processor as a safety measure. The raising of the processor operating point can cause the processor to exceed the thermal constraints or damage the processor. However, an alternate embodiment of the present invention can allow for software control to raise the operating point if the user is testing other thermal protection mechanisms or if the system software has accurate information about the die temperature such as through the system management thermal monitoring function.

Also contained within processor 102 are a fuse array 214 and output registers 216, 218. Fuse array 214 of this embodiment is a memory located on the processor 102 and contains information as to operating points based on different frequency and voltage points. Controller 108 loads this data during startup and uses the information to adjust the processor operating point based on the present power situation. The controller 108 of this embodiment reads an array 214 of fuses that binary encode the min, max, and default or wakeup values for the following parameters: the operating voltage, the operating frequency, and voltage/frequency adjustment steps. The voltage/frequency adjustment steps are pairs of working voltage/frequency points that the controller is designed to step through. During normal operation, controller 108 reads in a sensor value and determines how much power the processor 102 is consuming. The controller 108 compares this power consumption value with the stored operating points loaded from the fuse array 214 to determine what processor frequency and voltage points will allow for optimal performance while remaining within the allowable or tolerable power and thermal envelope.

Controller 108 outputs the chosen operating frequency and voltage out to output registers 216, 218 as 8 control bits in this embodiment. Alternative embodiments can have a different number of control bits as needed. A greater number of bits can allow for finer granularity in frequency and voltage adjustments. Thus different ratios are possible. For example, some bit settings can cause the frequency to vary from 5% to 10% to 15%. The upper 4 output bits are driven to a voltage identification (VID) register 216. The value in the VID register 216 is used to adjust the voltage provided from the voltage regulator module (VRM) 220. The VRM supplies power to the processor 102. Depending on the VID value, the VRM can increase or decrease the supply voltage. The lower 4 output bits are driven to a frequency control register 218. The value in the frequency register 218 is used to adjust the frequency of the clock signal generated from the voltage controlled oscillator (VCO) in the main phase locked loop (PLL) or 222. Depending on the value in the frequency register 218, the PLL/VCO 222 can increase or decrease the clock frequency. The output register 216, 218 of this embodiment is also software visible and reflects the voltage and frequency values in real time. Both voltage and frequency are adjusted while the processor 102 continues normal operation. Thus no performance loss is incurred.

The clock generator circuit 222 of this example is capable of altering the frequency on the fly. Thus the PLL adjustment here does not result in relock time penalty. Clock frequency is adjusted without waiting for the PLL to relock. This is essential for a server which cannot be unavailable for any amount of time. Unlike the frequency adjustment methods of existing schemes, this method of the present invention does not change the bus ratio. A bus ratio change would cause a significant performance loss to a processor in a server environment. The bus ratio of the present method remains the same while the PLL frequency is slowly adjusted up or down.

Input from the external pin 201 and software inputs 210 can override the controller. Pin signal 202 can force the controller 108 to output certain frequency and voltage settings to the registers 216, 218. Similarly, software inputs 210 can cause the controller 108 to choose a different operating point than that determined based on the sensor value. For the present embodiment, pin signal 202 and software inputs 210 are allowed to shift the frequency and voltage settings to values less than that indicated in the stored operating points of the fuse array. The hardware input 202 and software inputs 210 of this embodiment are limited from forcing the controller to adjust the frequency and voltage to a higher operating point as a safety measure. Operating the processor at a higher frequency and voltage than allowed can cause the processor 102 to exceed the safe power and thermal envelope, possibly resulting in errors or damage.

For this embodiment, the controller 108 operates on a low frequency clock that is independent of the main processor clock. The controller reads the power sensor value and the software control register during normal operation. The sensor value and register contents are evaluated with the fuse tables in order to compute a new voltage/frequency operating point for the processor. The new voltage/frequency settings are then loaded into the output register to take effect. The controller 108 of this embodiment can be turned off through the control register. The user can overwrite the output register via external software control.

FIG. 3 is a flow chart representing one embodiment of a method in accordance with the present invention for adjusting the voltage and frequency to minimize power dissipation in a multiprocessor system. This example generally describes the operation of a frequency/voltage adjustment mechanism of one embodiment. At step 302, the controller loads the frequency and voltage data from memory at startup. The data comprises valid frequency/voltage pairs for different operating points. Thus the mechanism can lookup what the frequency and voltage control bits should be set at based on the present given power consumption levels. For this embodiment, this frequency/voltage information is stored in a fuse array on the processor. The data can also be stored external to the processor or in another memory.

After the controller is configured, the mechanism enters into normal operation. At step 304, the sensors are queried. The number and type of sensors used depends on the particular embodiment. For example, the sensor may sense current, power, temperature, or processing load. Similarly, more than one type of sensor can be used on a processor. The hardware inputs are queried at step 306. The hardware input can be an external hardware pin from the system. At step 308, software inputs are queried. The software inputs of one embodiment are software signals from system management software or the operating system.

The sensor values and hardware and software inputs are evaluated at step 310. The mechanism determines how much power the processor is consuming. Based on the processor power consumption is, the controller can find an appropriate operating point for the processor. At step 312, the mechanism decides whether the operating point of the processor should be adjusted. The controller of this embodiment compares the power consumption value with a table of values stored in memory to determine what the frequency and voltage should be set at. If the frequency and voltage values are the same or approximate to the present values or otherwise within acceptable limits, the processor operating point should not be adjusted. The mechanism continues to monitor the processor and queries the sensor and inputs. If the frequency and voltage values are different from the present values, the processor operating point should be adjusted.

The mechanism outputs the new frequency and voltage settings at step 314. These settings have been picked based on the desired operating point. For one embodiment, the settings are chosen to provide optimal processor efficiency while minimizing processor power dissipation. At step 316, the new frequency and voltage settings take effect at the clock generator and the power supply, respectively. The mechanism continues to monitor the processor and evaluates the sensors and inputs for further changes.

The example of FIG. 3 has been described in the context of a single processor. In a multiprocessor system, the method can be performed concurrently in each processor. For example, each processor can be adjusting its own frequency and voltage settings independent of the other processors in the system. However, the overall system software may have the capability to control all of the processor either through a hardware pin or software inputs such as those of step 306 and 308.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

The invention claimed is:

1. A method comprising:
    determining a power consumption value of a processor by obtaining a compute load of said processor;
    evaluating said power consumption value to obtain a new operating point;
    comparing said new operating point with a present operating point; and
    adjusting a frequency setting and a voltage setting to correspond to said new operating point if said new operating point is different from said present operating point, the power consumption being controlled based on the obtained compute load.

2. The method of claim 1 wherein determining a power consumption value further comprises querying a sensor.

3. The method of claim 2 wherein said sensor is to obtain a current value indicating how much current is being consumed.

4. The method of claim 3 wherein said current value is used to calculate the power consumption value.

5. The method of claim 1 wherein said evaluating further comprises querying for system and user inputs, said user inputs to override said power consumption value and to affect choosing of said new operating point.

6. The method of claim 1 wherein said evaluating further comprises using said power consumption value to look up a frequency setting and a voltage setting for said new operating point in said frequency and voltage data.

7. The method of claim 6 wherein said adjusting further comprises outputting said frequency setting and said voltage setting to a control register, said frequency setting to adjust signal output of a clock generator and said voltage setting to adjust voltage output of a power supply.

8. The method of claim 7 wherein said evaluating further comprises determining whether said power consumption value is within an allowable range.

9. The method of claim 8 wherein said new operating point is chosen to have a new power consumption value within said allowable range.

10. The method of claim 2 wherein said sensor monitors compute load.

11. A processor comprising:
a controller to adjust the processor voltage and processor frequency;
a sensor coupled to said controller, said sensor to measure power consumption of said processor based on a compute load of said processor, the controller to control the power consumption based on the compute load;
a memory coupled to said controller, said memory to store a plurality of frequency and voltage settings corresponding to particular operating points; and
a control register coupled to said controller, said control register to receive a frequency setting and a voltage setting from said controller.

12. The processor of claim 11 wherein said control register is to drive said frequency setting to a clock generator, said frequency setting to adjust a clock signal output of said clock generator.

13. The processor of claim 12 further wherein said control register is to drive said voltage setting to a power supply coupled to said processor, said voltage setting to adjust a voltage output of said power supply.

14. The processor of claim 13 further comprising a hardware pin coupled to said controller, said pin to provide a hardware interrupt signal to alter operation of said controller.

15. The processor of claim 14 further comprising software registers to receive software inputs to said controller, said software inputs to provide for software control of said controller and to alter operation of said controller.

16. The processor of claim 15 wherein said memory is a fused array storing a table of data comprising of settings for frequency and voltage pairs corresponding to said particular operating points.

17. The processor of claim 16 wherein said controller comprises logic to evaluate said power consumption values and to select a new operating point and to determine whether to change present operating point of said processor to said new operating point.

18. The processor of claim 17 wherein said present operating point comprises a first frequency setting and a first voltage setting, and said new operating point comprises a second frequency setting and a second voltage setting.

19. The processor of claim 18 wherein said controller comprises logic to output said second frequency setting and said second voltage setting to said control register.

* * * * *